US012682906B2

(12) United States Patent
Fang et al.

(10) Patent No.: US 12,682,906 B2
(45) Date of Patent: Jul. 14, 2026

(54) SPEAKER IDENTIFICATION ACCURACY

(71) Applicant: Google LLC, Mountain View, CA (US)

(72) Inventors: Yeming Fang, Santa Clara, CA (US); Quan Wang, Hoboken, NJ (US); Pedro Jose Moreno Mengibar, Jersey City, NJ (US); Ignacio Lopez Moreno, New York, NY (US); Gang Feng, Beijing (CN); Fang Chu, Santa Clara, CA (US); Jin Shi, Beijing (CN); Jason William Pelecanos, White Plains, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/933,164

(22) Filed: Sep. 19, 2022

(65) Prior Publication Data

US 2023/0015169 A1 Jan. 19, 2023

Related U.S. Application Data

(63) Continuation of application No. 17/071,223, filed on Oct. 15, 2020, now Pat. No. 11,468,900.

(51) Int. Cl.
*G10L 17/00* (2013.01)
*G10L 17/06* (2013.01)
(52) U.S. Cl.
CPC .................................... *G10L 17/06* (2013.01)
(58) Field of Classification Search
None
See application file for complete search history.

(56) References Cited

U.S. PATENT DOCUMENTS 5,414,755 A * 5/1995 Bahler .................. H04M 15/00
379/189
5,950,157 A 9/1999 Heck et al.
(Continued)

FOREIGN PATENT DOCUMENTS

| CN | 106373564 A | 2/2017 |
| CN | 111418009 A | 7/2020 |

(Continued)

OTHER PUBLICATIONS

Training Utterance-level Embedding Networks for Speaker Identification and Verification, Sep. 26, 2018.
(Continued)

*Primary Examiner* — Jakieda R Jackson
(74) *Attorney, Agent, or Firm* — Honigman LLP; Brett A. Krueger; Grant Griffith

(57) ABSTRACT

A method of generating an accurate speaker representation for an audio sample includes receiving a first audio sample from a first speaker and a second audio sample from a second speaker. The method includes dividing a respective audio sample into a plurality of audio slices. The method also includes, based on the plurality of slices, generating a set of candidate acoustic embeddings where each candidate acoustic embedding includes a vector representation of acoustic features. The method further includes removing a subset of the candidate acoustic embeddings from the set of candidate acoustic embeddings. The method additionally includes generating an aggregate acoustic embedding from the remaining candidate acoustic embeddings in the set of candidate acoustic embeddings after removing the subset of the candidate acoustic embeddings.

20 Claims, 8 Drawing Sheets

300

Receiving, At Data Processing Hardware, A First Audio Sample From A First Speaker And A Second Audio Sample From A Second Speaker
302

For Each Audio Sample Of The First Audio Sample And The Second Audio Sample:

Dividing, By The Data Processing Hardware, The Respective Audio Sample Into A Plurality Of Audio Slices
304a Based On The Plurality Of Slices, Generating, By The Data Processing Hardware, A Set Of Candidate Acoustic Embeddings, Each Candidate Acoustic Embedding Comprising A Vector Representation Of Acoustic Features
304b Removing, By The Data Processing Hardware, A Subset Of The Candidate Acoustic Embeddings From The Set Of Candidate Acoustic Embeddings
304c Generating, By The Data Processing Hardware, An Aggregate Acoustic Embedding From The Remaining Candidate Acoustic Embeddings In The Set Of Candidate Acoustic Embeddings After Removing The Subset Of The Candidate Acoustic Embeddings
304d

304

(56) References Cited

U.S. PATENT DOCUMENTS

| | | | | |
|---|---|---|---|---|
| 6,678,661 | B1* | 1/2004 | Smith | G10L 21/02 |
| | | | | 704/278 |
| 7,650,281 | B1* | 1/2010 | Cusmariu | G10L 17/08 |
| | | | | 704/274 |
| 9,728,188 | B1 | 8/2017 | Rosen et al. | |
| 9,875,742 | B2 | 1/2018 | Gorodetski et al. | |
| 9,961,410 | B1 | 5/2018 | Wang | |
| 10,497,382 | B2* | 12/2019 | Chaudhuri | H04N 21/233 |
| 10,645,214 | B1 | 5/2020 | Gainsboro et al. | |
| 10,720,157 | B1* | 7/2020 | Kapila | G06Q 30/0621 |
| 10,902,942 | B1 | 1/2021 | Hames et al. | |
| 11,521,623 | B2* | 12/2022 | DiMaria | G10L 17/06 |
| 11,735,156 | B1* | 8/2023 | Trueba | G10L 13/02 |
| | | | | 704/200 |
| 11,947,872 | B1* | 4/2024 | Mahler-Haug | G10L 15/08 |
| 2003/0130846 | A1* | 7/2003 | King | G10L 15/144 |
| | | | | 704/E15.034 |
| 2005/0182629 | A1 | 8/2005 | Coorman et al. | |
| 2007/0244703 | A1 | 10/2007 | Adams et al. | |
| 2008/0059535 | A1 | 3/2008 | Lindsley et al. | |
| 2008/0091428 | A1 | 4/2008 | Bellegarda | |
| 2009/0198495 | A1* | 8/2009 | Hata | G10L 15/04 |
| | | | | 704/E17.001 |
| 2009/0326942 | A1* | 12/2009 | Fulop | G10L 17/02 |
| | | | | 704/E17.001 |
| 2010/0057232 | A1 | 3/2010 | Glatt et al. | |
| 2011/0087491 | A1* | 4/2011 | Wittenstein | G10L 15/26 |
| | | | | 704/235 |
| 2011/0196688 | A1* | 8/2011 | Jones | G10L 19/167 |
| | | | | 704/503 |
| 2011/0202345 | A1* | 8/2011 | Meyer | G10L 13/02 |
| | | | | 704/E13.011 |
| 2013/0332153 | A1* | 12/2013 | Markovic | G10L 25/78 |
| | | | | 704/219 |
| 2014/0249891 | A1 | 9/2014 | Olguin Olguin et al. | |
| 2014/0330563 | A1* | 11/2014 | Faians | G06Q 30/0185 |
| | | | | 704/236 |
| 2015/0127342 | A1 | 5/2015 | Sharifi et al. | |
| 2015/0170660 | A1 | 6/2015 | Han et al. | |
| 2016/0163331 | A1* | 6/2016 | Yamaguchi | G11B 27/105 |
| | | | | 704/235 |
| 2016/0247520 | A1 | 8/2016 | Kikugawa | |
| 2016/0293167 | A1 | 10/2016 | Chen et al. | |
| 2016/0343372 | A1* | 11/2016 | Motomura | G10L 17/22 |
| 2016/0372096 | A1* | 12/2016 | Lyske | A63B 69/00 |
| 2017/0075652 | A1* | 3/2017 | Kikugawa | G10L 21/12 |
| 2017/0092264 | A1 | 3/2017 | Hakkani-Tur et al. | |
| 2018/0074145 | A1* | 3/2018 | Kluge | G01R 33/561 |
| 2018/0189110 | A1 | 7/2018 | Venkatesh et al. | |
| 2018/0233140 | A1 | 8/2018 | Koishida et al. | |
| 2018/0240470 | A1* | 8/2018 | Wang | G10L 19/008 |
| 2018/0342258 | A1* | 11/2018 | Huffman | G10L 13/033 |
| 2018/0374486 | A1 | 12/2018 | Zhao et al. | |
| 2019/0005976 | A1* | 1/2019 | Peleg | G10L 25/30 |
| 2019/0007623 | A1* | 1/2019 | Wang | H04N 7/147 |
| 2019/0058745 | A1* | 2/2019 | Mocioiu | H04L 67/306 |
| 2019/0164534 | A1* | 5/2019 | Iwase | G10L 25/27 |
| 2019/0244624 | A1* | 8/2019 | Han | G10L 19/018 |
| 2019/0378532 | A1* | 12/2019 | Aucouturier | G10L 21/003 |
| 2019/0392802 | A1* | 12/2019 | Higurashi | G06N 20/00 |
| 2019/0394423 | A1* | 12/2019 | Ishige | H04N 5/772 |
| 2020/0135209 | A1 | 4/2020 | Delfarah et al. | |
| 2020/0152207 | A1* | 5/2020 | Wang | G10L 17/04 |
| 2020/0169591 | A1 | 5/2020 | Ingel et al. | |
| 2020/0202869 | A1* | 6/2020 | Wang | G10L 17/18 |
| 2020/0211571 | A1* | 7/2020 | Shoa | G10L 17/22 |
| 2020/0279568 | A1* | 9/2020 | Vaquero Avilés-Casco | |
| | | | | G10L 17/00 |
| 2020/0296521 | A1* | 9/2020 | Wexler | G06V 40/165 |
| 2020/0310746 | A1* | 10/2020 | Kopparapu | G10L 21/06 |
| 2020/0311543 | A1 | 10/2020 | Jamali et al. | |
| 2020/0342857 | A1* | 10/2020 | Moreno | G10L 15/22 |
| 2020/0365160 | A1 | 11/2020 | Nassar et al. | |
| 2021/0056980 | A1* | 2/2021 | Gfeller | G10L 19/035 |
| 2021/0110895 | A1* | 4/2021 | Shriberg | G06F 40/20 |
| 2021/0174817 | A1* | 6/2021 | Grauman | G10L 25/51 |
| 2021/0272571 | A1 | 9/2021 | Balasubramaniam et al. | |
| 2021/0289070 | A1* | 9/2021 | Thomson | H04M 3/42391 |
| 2021/0319056 | A1* | 10/2021 | Zhao | G06F 16/43 |
| 2021/0319804 | A1* | 10/2021 | Whitehill | G06N 3/044 |
| 2021/0343269 | A1 | 11/2021 | Sathsahayaraman et al. | |
| 2021/0343294 | A1* | 11/2021 | Wintrode | G10L 17/02 |
| 2022/0101869 | A1* | 3/2022 | Wichern | G10L 21/028 |
| 2022/0121623 | A1* | 4/2022 | Lyske | G06F 9/52 |
| 2022/0121868 | A1* | 4/2022 | Chen | G10L 17/22 |
| 2022/0122611 | A1* | 4/2022 | Wang | G10L 17/04 |
| 2022/0172708 | A1* | 6/2022 | Wang | G10L 15/16 |
| 2022/0208204 | A1* | 6/2022 | Sivaraman Narayanaswamy | |
| | | | | G10L 21/0272 |
| 2022/0358905 | A1* | 11/2022 | Gupta | G06F 40/42 |
| 2023/0130136 | A1* | 4/2023 | Aronowitz | G10L 17/06 |
| | | | | 704/231 |
| 2023/0169988 | A1* | 6/2023 | Kim | G06N 3/045 |
| | | | | 704/200 |
| 2023/0260501 | A1* | 8/2023 | Trueba | G10L 15/02 |
| | | | | 704/200 |
| 2023/0401238 | A1* | 12/2023 | Khan | G06F 16/245 |
| 2023/0419979 | A1* | 12/2023 | Kim | G10L 17/06 |
| 2024/0096346 | A1* | 3/2024 | Togami | G10L 21/0272 |

FOREIGN PATENT DOCUMENTS

| | | |
|---|---|---|
| JP | 2005-309138 A | 11/2005 |
| JP | 2020-067566 A | 4/2020 |

OTHER PUBLICATIONS

Japanese Office Action for the related JP application No. 2023-523161dated Jan. 9, 2024.

Office Action issued in Chinese Patent Application No. 202180070524.6, dated Nov. 15, 2025.

Gutierrez, David Martin et al: "An End-to-End Speaker Diarization Service for Improving Multimedia Content Access", NEM Summit 2020, Jun. 30, 2020.

Jin, Shi et al: "Defensive Publications Series Utterance Augmentation for Speaker Recognition". Technical Disclosure Commons, May 18, 2020.

* cited by examiner

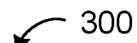

300

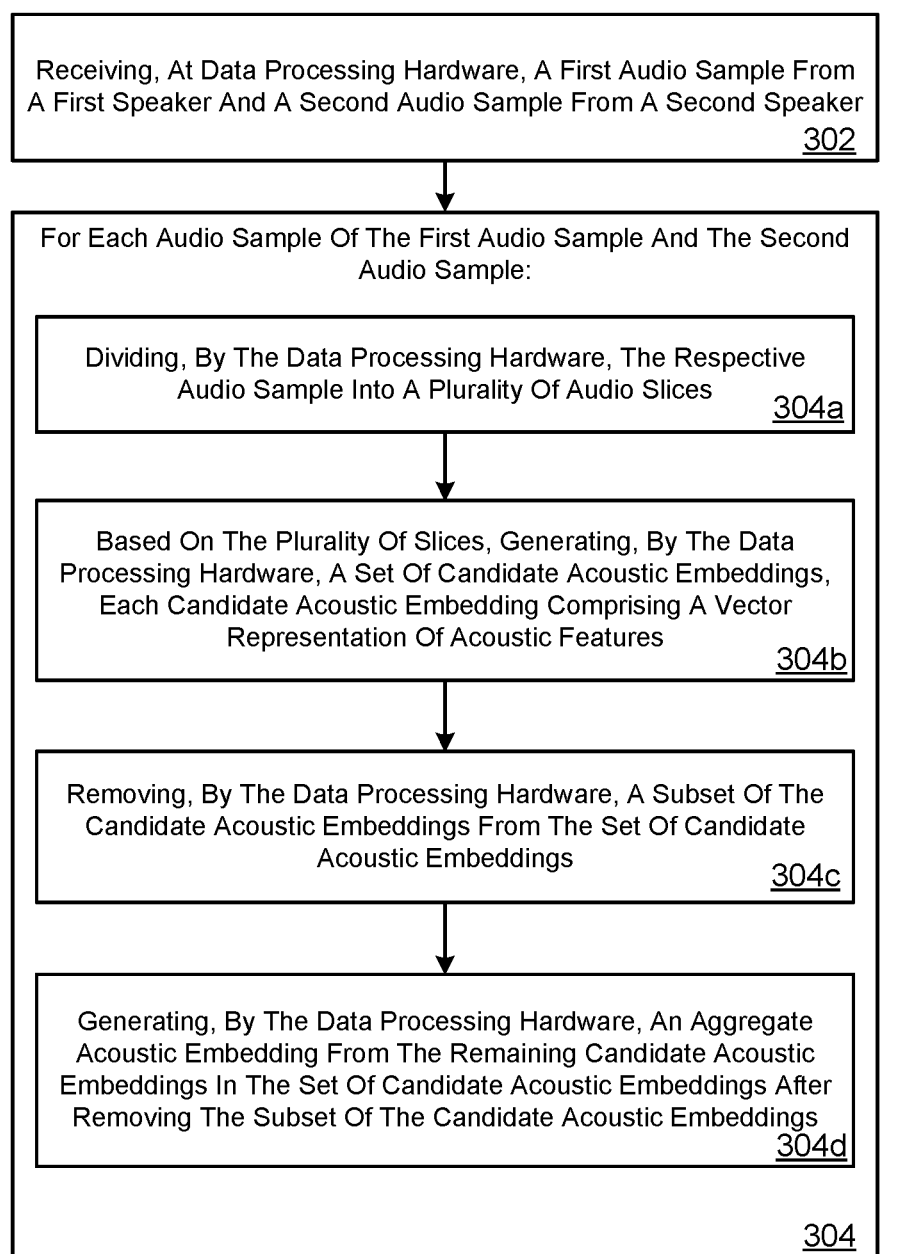

Receiving, At Data Processing Hardware, A First Audio Sample From A First Speaker And A Second Audio Sample From A Second Speaker
302

For Each Audio Sample Of The First Audio Sample And The Second Audio Sample:

Dividing, By The Data Processing Hardware, The Respective Audio Sample Into A Plurality Of Audio Slices
304a Based On The Plurality Of Slices, Generating, By The Data Processing Hardware, A Set Of Candidate Acoustic Embeddings, Each Candidate Acoustic Embedding Comprising A Vector Representation Of Acoustic Features
304b Removing, By The Data Processing Hardware, A Subset Of The Candidate Acoustic Embeddings From The Set Of Candidate Acoustic Embeddings
304c Generating, By The Data Processing Hardware, An Aggregate Acoustic Embedding From The Remaining Candidate Acoustic Embeddings In The Set Of Candidate Acoustic Embeddings After Removing The Subset Of The Candidate Acoustic Embeddings
304d

SPEAKER IDENTIFICATION ACCURACY

CROSS REFERENCE TO RELATED APPLICATIONS

This U.S. patent application is a continuation of, and claims priority under 35 U.S.C. § 120 from, U.S. patent application Ser. No. 17/071,223, filed on Oct. 15, 2020. The disclosure of this prior application is considered part of the disclosure of this application and is hereby incorporated by reference in its entirety.

TECHNICAL FIELD

This disclosure relates to improving speaker identification accuracy.

BACKGROUND

Recently, computing devices that provide multiple user input modalities have become more prevalent. For example, smartphones and other user devices include speech recognition services that allow users to provide voice inputs to a device as an alternative to typing or pointing inputs. Voice-based inputs may be more convenient in some circumstances as a hands-free means for interacting with the computing device. Some devices require that a user's identity be verified before performing an action based upon voice input, in order to guard against breaches of privacy and security. Often, it may be difficult for this verification performed by devices to identify a user with little or limited information (e.g., audio data) about the voice of the user.

SUMMARY

One aspect of the disclosure provides method of generating an accurate speaker representation for an audio sample. The method includes receiving, at data processing hardware, a first audio sample from a first speaker and a second audio sample from a second speaker. For each audio sample of the first audio sample and the second audio sample, the method includes dividing, by the data processing hardware, the respective audio sample into a plurality of audio slices. For each audio sample of the first audio sample and the second audio sample, the method also includes based on the plurality of slices, generating, by the data processing hardware, a set of candidate acoustic embeddings where each candidate acoustic embedding includes a vector representation of acoustic features. For each audio sample of the first audio sample and the second audio sample, the method further includes removing, by the data processing hardware, a subset of the candidate acoustic embeddings from the set of candidate acoustic embeddings. For each audio sample of the first audio sample and the second audio sample, the method additionally includes generating, by the data processing hardware, an aggregate acoustic embedding from the remaining candidate acoustic embeddings in the set of candidate acoustic embeddings after removing the subset of the candidate acoustic embeddings. In some examples, the method also includes determining, by the data processing hardware, whether the aggregate acoustic embedding generated for the first audio sample from the first speaker corresponds to the aggregate acoustic embedding generated for the second audio sample from the second speaker and when the aggregate acoustic embedding generated for the first audio sample from the speaker corresponds to the aggregate acoustic embedding generated for the second audio sample from the second speaker, identifying, by the data processing hardware, that the first speaker and the second speaker are the same speaker. In some implementations, the method further includes determining, by the data processing hardware, whether a distance between the aggregate acoustic embedding generated for the first audio sample from the first speaker and the aggregate acoustic embedding generated for the second audio sample from the second speaker satisfies a distance threshold and when the distance between the aggregate acoustic embedding generated for the first audio sample from the first speaker and the aggregate acoustic embedding generated for the second audio sample from the second speaker satisfies the distance threshold, identifying, by the data processing hardware, that the first speaker and the second speaker are the same speaker.

Another aspect of the disclosure provides a system of generating an accurate speaker representation for an audio sample. The system includes data processing hardware and memory hardware in communication with the data processing hardware. The memory hardware stores instructions that when executed on the data processing hardware cause the data processing hardware to perform operations. The operations include receiving a first audio sample from a first speaker and a second audio sample from a second speaker. For each audio sample of the first audio sample and the second audio sample, the operations include dividing the respective audio sample into a plurality of audio slices. For each audio sample of the first audio sample and the second audio sample, the operations also include, based on the plurality of slices, generating a set of candidate acoustic embeddings where each candidate acoustic embedding includes a vector representation of acoustic features. For each audio sample of the first audio sample and the second audio sample, the operations further include removing a subset of the candidate acoustic embeddings from the set of candidate acoustic embeddings. For each audio sample of the first audio sample and the second audio sample, the operations additionally include generating an aggregate acoustic embedding from the remaining candidate acoustic embeddings in the set of candidate acoustic embeddings after removing the subset of the candidate acoustic embeddings. In some examples, the operations also include determining whether the aggregate acoustic embedding generated for the first audio sample from the first speaker corresponds to the aggregate acoustic embedding generated for the second audio sample from the second speaker and when the aggregate acoustic embedding generated for the first audio sample from the speaker corresponds to the aggregate acoustic embedding generated for the second audio sample from the second speaker, identifying that the first speaker and the second speaker are the same speaker. In some implementations, the operations further include determining whether a distance between the aggregate acoustic embedding generated for the first audio sample from the first speaker and the aggregate acoustic embedding generated for the second audio sample from the second speaker satisfies a distance threshold and when the distance between the aggregate acoustic embedding generated for the first audio sample from the first speaker and the aggregate acoustic embedding generated for the second audio sample from the second speaker satisfies the distance threshold, identifying that the first speaker and the second speaker are the same speaker.

Implementations of either the system or the method may include one or more of the following optional features. In some implementations, each candidate acoustic embedding comprises a respective d-vector. In some examples, generating the set of candidate acoustic embeddings based on the plurality of audio slices comprises generating each candidate acoustic embedding in the set of candidate acoustic embeddings by reordering the audio slices in the plurality of audio slices divided from the respective audio sample into an order that is different from the respective audio sample, concatenating the reordered audio slices, and generating the corresponding candidate acoustic embedding based on the concatenation of the reordered audio slices. Here, an order of the audio slices in the concatenation of the reordered audio slices associated with each candidate acoustic embedding is different. In some of these examples, concatenating the reordered audio slices includes determining that the concatenation of the reordered audio slices satisfies a time threshold. In some configurations, generating the set of candidate acoustic embeddings includes generating the set of candidate acoustic embeddings using a neural network acoustic model where the neural network acoustic model configured to receive, as input, audio data and to generate, as output, an acoustic embedding.

In some implementations, removing the subset of the candidate acoustic embeddings from the set of candidate acoustic embeddings includes the following operations. For each candidate acoustic embedding in the set of candidate acoustic embeddings, the operations include determining a distance from the respective candidate acoustic embedding to each other candidate acoustic embedding in the set of candidate acoustic embeddings and generating a distance score for the respective candidate acoustic embedding based on the distances determined from the respective candidate acoustic embedding to each other candidate acoustic embedding of the set of candidate acoustic embeddings. The operations also includes selecting a threshold number of the candidate acoustic embeddings in the set of candidate acoustic embeddings that are associated with the lowest distance score.

In some examples, removing the subset of the candidate acoustic embeddings from the set of candidate acoustic embeddings includes the following operations. For each candidate acoustic embedding in the set of candidate acoustic embeddings, the operations include determining a distance from the respective candidate acoustic embedding to each other candidate acoustic embedding in the set of candidate acoustic embeddings and generating a distance score for the respective candidate acoustic embedding based on the distances determined from the respective candidate acoustic embedding to each other candidate acoustic embedding of the set of candidate acoustic embeddings. The operations also includes selecting each candidate acoustic embedding in the set of candidate acoustic embeddings whose distance score fails to satisfy a distance score threshold.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a flow chart of an example arrangement of operations for a method of generating a speaker representation for an audio sample.

Like reference symbols in the various drawings indicate like elements.

DETAILED DESCRIPTION

Figure 1A:
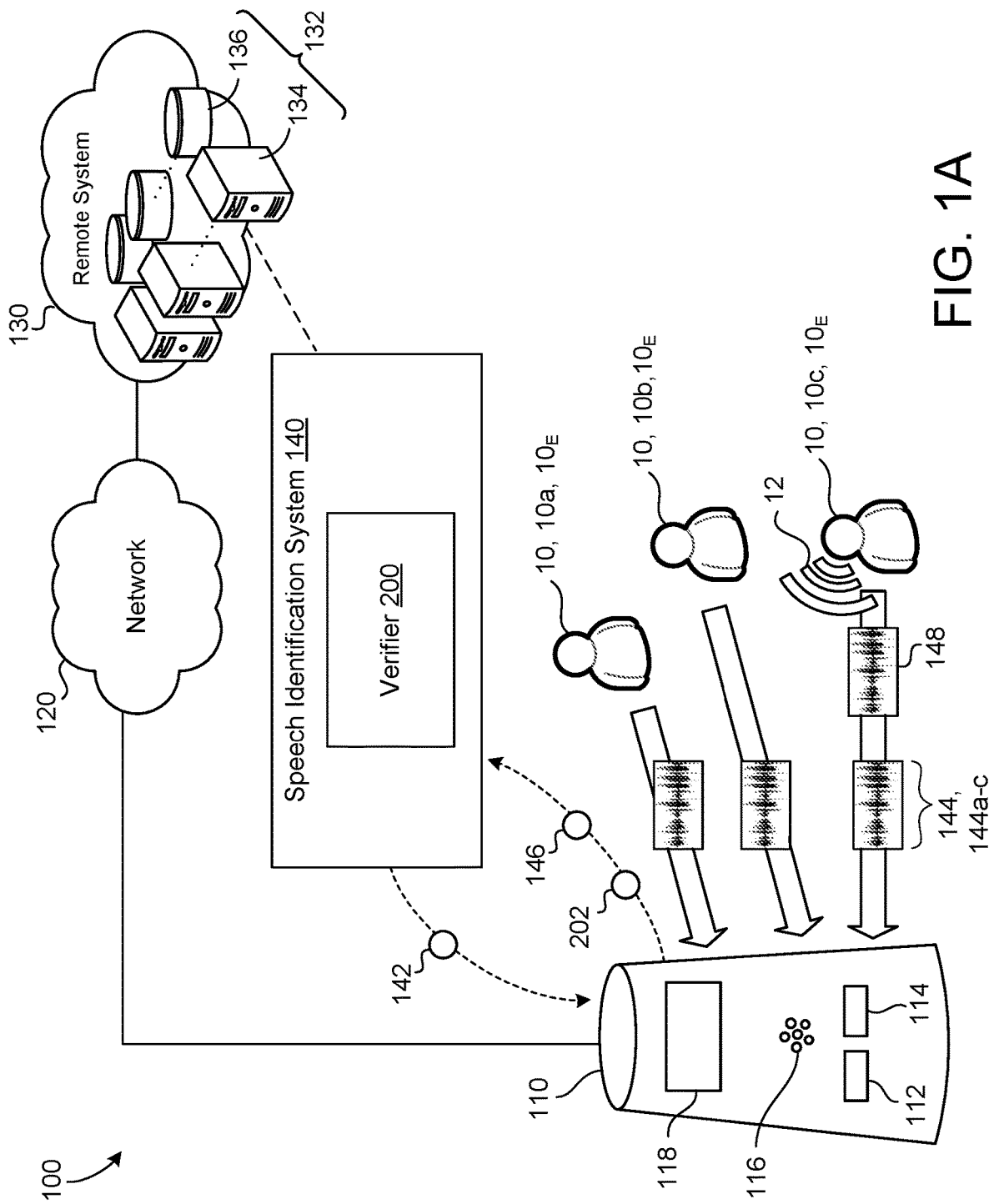
FIGS. 1A and 1B are schematic views of example speech environments for a speaker identification system.

Generally, speaker identification refers to a process of identifying a speaker based on one or more audio samples. One such form of speaker identification is speaker verification. Speaker verification refers to a process of verifying whether two or more utterances originated from the same speaker. To perform this verification, a speaker identification system compares audio samples (e.g., two audio samples) and determines whether a first audio sample corresponding to a first utterance spoken by a speaker matches or closely resembles a second audio sample corresponding to another spoken utterance. When the first utterance matches or closely resembles the other spoken utterance, the speaker identification system identifies that both utterances are likely from the same speaker. On the other hand, when the first utterance fails to match or to closely resemble the other spoken utterance, the speaker identification system identifies that each utterance is likely from a different speaker. When comparing two audio samples, a speaker identification system may use a vector-based approach or a model-based approach. In a vector-based approach, the speaker identification system compares a first vector for the first audio sample to a second vector for the second audio sample. The vector, which can also be referred to as a d-vector or acoustic embedding, is a vector generated by, or received at, the speaker identification system that represents the acoustic characteristics of the audio sample. To determine whether the speaker of one audio sample is the same as a speaker for another audio sample, the vector-based approach generates a d-vector for each audio sample and compares these d-vectors in order to determine whether each audio sample originates from the same audio source (i.e., from the same speaker). In other words, when the first audio sample has a d-vector that closely resembles the d-vector from the second audio sample, the speaker identification system determines that the similar d-vectors indicate that the audio samples likely originate from the same speaker.

In comparison, the model-based approach inputs the two audio samples into a speaker identification model and uses the model to generate a prediction of whether the speakers from the two audio samples are the same speaker. In other words, the model is trained to identify when two input audio samples are likely to be the same speaker or different speakers. Although the vector-based approach and the model-based approach function to perform speaker identification, both of these approaches share a common setback that either approach is contingent on the quality of the two audio samples provided. For instance, although the model may be trained on a larger corpus of samples, the model predicates its prediction on the ability of the input audio sample to represent the speech characteristics of its corresponding speaker. Likewise, the vector-based approach is confined to how well the vector representation of the audio sample represents the speech characteristics of the speaker. But unfortunately, a particular audio sample may not include the audio characteristics which optimally represent a speaker. For example, if a speaker has a particular British accent, but the speaker's British accent is not as pronounced or distinguishable when the speaker says a particular phrase, an audio sample of the particular phrase may not be a good d-vector representation (e.g., for a vector-based approach) or input audio sample (e.g., for a model-based approach) of the speaker to compare to other spoken phrases (i.e., audio samples) by the speaker. With this in mind, when a speaker identification system performs speaker identification using a single sample audio, the speaker identification system may not always have the best input of audio information to identify a speaker or a similarity between speakers. In fact, a single audio sample is unlikely to be an optimal acoustic representation of the speaker.

To overcome this issue that a particular audio sample may not be an optimal representation of the speaker, a speaker identification system may use a single audio sample to generate multiple variations of the audio sample. By generating multiple variations of the audio sample, there is likely a greater probability that at least one of the many variations of the audio sample accurately represents the speaker. In other words, by having more than one audio sample, the speaker identification system may increase its likelihood that it correctly performs speaker verification. To generate multiple variations from a single audio sample, the speaker identification may use various audio sample augmentation processes.

For a vector-based approach, the audio sample augmentation process generates multiple variations of a single audio sample that, in turn, generates multiple d-vectors for each variation of the single audio sample. With more d-vectors, there is likely a greater probability that at least one of the many d-vectors accurately represents the speaker. To generate multiple d-vectors from a single audio sample, the speaker identification system utilizes the fact that any length of an audio sample may generate a d-vector. For instance, a single d-vector may be generated for a ten minute audio sample or a single d-vector may be generated for a half second (0.5 second) audio sample. In other words, the generation of the d-vector is irrespective of the length of the audio sample. Therefore, a single audio sample that is three seconds long may form a single d-vector corresponding to the spoken audio during the three seconds or the three second audio sample may be divided into one second (1 second) audio slices and the speaker identification system generates a d-vector for each of the audio slices. This means that, in this example, instead of having a single d-vector with the hope that the single d-vector accurately represents the speech characteristics of the speaker, the speaker identification system has three d-vectors that each may have some degree of accuracy to represent the speech characteristics of the speaker.

When a speaker identification system generates a greater number of d-vectors, the speaker identification system may be configured to use the multiple d-vectors to identify which d-vector or set of d-vectors are the most accurate representation(s) of the speaker. Here, with a greater number of d-vectors or vector samples that represent the speaker of the audio sample, the speaker identification system may compare each of these samples to each other to identify outlier d-vectors that are unlikely to represent the speaker accurately. For instance, if each of the multiple d-vectors accurately represented to speaker, the multiple d-vectors would appear to spatially converge in a dimensional space. In other words, a spatial representation of the multiple d-vectors would illustrate a tight cluster of d-vectors around a theoretical perfect d-vector representation of the speaker. In contrast, a system that only generates a single d-vector from an audio sample for speaker identification is not capable of performing this relative comparison of multiple d-vectors to determine whether the single d-vector is an accurate representation of the speaker. To extend the scenario further, without knowing whether a single d-vector is an accurate representation of the speaker, a speaker identification system may inevitably use a d-vector that poorly represents the speaker to verify the speaker. With this poor representation, there becomes an increased probability that the speaker identification system fails to correctly verify the speaker. When a speaker's identity becomes tied to various permissions or rights, the speaker identification system may incorrectly prevent a speaker from accessing functionality that the speaker should be able to access based on his or her permissions/rights.

For a model-based approach, the audio sample augmentation process preforms spectrogram augmentation on an audio sample to produce several variations of the spectrogram. In other words, since the input to the model is based on the audio sample, the spectrogram augmentation process generates spectrogram variations of the audio sample. Like the vector-based approach, by generating multiple spectrogram variations, the model is able to receive multiple inputs for each audio sample. With multiple inputs rather than a single input corresponding to the audio sample, the model is more likely to be more informed and, thus, to base its prediction on more representations of the speaker of the audio sample. In other words, this approach of multiple inputs per audio sample provides the model with a greater understanding of the speech characteristics for the speaker of the audio sample, which, in turn may result in a better prediction for speaker identification and/or verification.

FIG. 1A is an example of a speech environment 100 that includes one or more users 10 communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 may field the query for the command by answering the query and/or causing the command to be performed.

Here, the device 110 is configured to detect utterances 12 and to invoke a local or a remote speaker identification process. The device 110 may correspond to any computing device associated with the user 10 and capable of receiving audio signals corresponding to spoken utterances 12. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to utterance detection or some other form of utterance/speech processing (e.g., speech identification and/or speech verification).

In some examples, the device 110 includes one or more applications (i.e., software applications) where each application may utilize one or more speech processing systems (e.g., a speech recognition system, a text-to-speech system, a speaker identification system 140, etc.) associated with device 110 to perform various functions within the application. In some implementations, the device 110 may detect an utterance 12 and provide data characterizing the utterance 12 to the one or more speech processing systems. For instance, the device 110 includes a speech identification application configured to identify the speaker 10 of an utterance 12. The speech identification application may perform a speaker verification process that verifies an identity of a speaker 10 of the utterance 12. For instance, speaker verification involves accepting or rejecting an identity claim of a speaker 10 based on characteristics of the speaker's voice, as determined by one or more utterances 12 from the speaker 10. In some examples, the device 110 is configured with the application locally to perform local speaker verification or remotely to utilize remote resources to perform some portion of speaker verification.

The device 110 further includes an audio subsystem with an audio capturing device (e.g., a microphone) 116 for capturing and converting spoken utterances 12 within the speech environment 100 into electrical signals. While the device 110 implements a single audio capturing device 116 in the examples shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle. Additionally or alternatively, the device 110 also includes a speech output device (e.g., a speaker) 118 for communicating an audible audio signal from the device 110. For instance, the device 110 is configured to generate a synthesized playback signal in response to a detected utterance 12. In other words, an utterance 12 may correspond to a query that the device 110 answers with synthesized audio generated by the device 110 and communicated via the speech output device 118.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing such as speech recognition and/or speaker identification/verification. For instance, the device 110 is configured to perform speaker identification using a speaker identification system 140. This system 140 may reside on the device 110 (referred to as on-device systems) or reside remotely (e.g., reside on the remote system 130), but in communication with the device 110. In some examples, some portions of the system 140 reside locally or on-device while others reside remotely. For instance, the verifier 200 that is configured to perform speech verification for the speaker identification system 140 resides remotely or locally. In some examples, the speaker identification system 140 may be combined with other speech processing systems such as speech recognition systems, diarization systems, text-to-speech systems, etc. In some configurations, the location of where the speaker identification system 140 resides is based on processing requirements. For example, when the system 140 is rather large in size or processing requirements, the system 140 may reside in the remote system 130. Yet when the device 110 may support the size or the processing requirements of the system 140, the one or more systems 140 may reside on the device 110 using the data processing hardware 112 and/or the memory hardware 114.

The speaker identification system 140 is generally configured to process data characterizing an utterance 12 and to provide a response 142 to the device 110 that indicates a result of a speech verification process performed by the verifier 200 of the speaker identification system 140. For instance, the speaker identification system 140 is the system that performs speech verification for a speech identification application of the device 110. In other words, the speaker identification system 140 is configured to perform a speaker verification process using a verifier 200 to verify an identity of a speaker 10 of the utterance 12. For instance, the response 142 may indicate whether a speaker 10 is registered with the device 110 (i.e., a registered speaker) based on a spoken utterance 12 by the speaker 10. In some examples, the speaker identification system 140 generates a response 142 that identifies the identity of the speaker 10 based on a verification process at the verifier 200.

Still referring to FIG. 1A, the device 110 may use the speaker identification system 140 to enroll one or more users 10a-c with the device 110. By enrolling a user 10 with the device 110, the enrollment serves as a type of speech registration process to identify an enrolled user 10, 10E as an authorized user of the device 110. The device 110 may be configurable such that an enrolled user 10E of the device 110 may have access to or control of various functions of the device 110 while an unauthorized user 10 that is not enrolled with the device 110 is prohibited from performing one or more functions that the device 110 is capable of performing. Optionally, the device 110 may enroll multiple users 10. With multiple users 10, each enrolled user 10E may configure a user account on the device 110 that has particular permissions or rights regarding functionality of the device 110. For example, the three users 10a-c in FIG. 1A correspond to a family of three with a husband, wife, and a nine-year old daughter. Here, when each adult enrolls with the device 110, the adults may setup parental controls that allow each adult to access or to control all the functionality of the device 110, but restrict their daughter, who is also an enrolled user 10E, from having entire control of the device 110. For example, the parents setup their daughter's account to prevent their daughter from modifying home automation controls such as the thermostat schedule controlled by the device 110. This means that one enrolled user 10E may have particular permissions or rights that overlap or are different from the permissions or rights of another enrolled user 10E. Moreover, instead of only generating permissions for enrollees, the device 110 may also be configured to designate permissions for a user 10 of the device 110 who is not an enrolled user 10E. For instance, when a user 10 of the device 110 is not an enrolled user 10E, the device 110 may be configured to perform limited functionality (e.g., a guest mode) or to entirely prevent the unenrolled user 10 from using the device 110. Without limitation, authorizing an enrolled user 10E may permit the device 110 to access resources only that enrolled user 10E has permission to access. For instance, in a household with at least two enrolled users 10E, in which one speaks the voice command "Play my music playlist" captured by the device 110, the verifier 200 can identify the identity of the particular enrolled speaker 10E and permit the device 110 to access the particular music playlist associated the identified speaker 10 and not the music playlists of the other enrolled users 10E.

In some configurations, the device 110 uses the speaker identification system 140 to perform the enrollment process of enrolling a user 10 as a registered speaker for the device 110. For example, a speaker identification application associated with the speaker identification process 140 prompts a user 10 to speak one or more enrollment utterances 144 from which a speaking signature 146 can be generated for the user 10. In some implementations, the enrollment utterances 144 are short phrases of, for example, one, two, three, four, or more words. The speaker identification system 140 may prompt the user 10 to speak pre-defined phrases as the enrollment utterances 144, or the user 10 may spontaneously speak and provide enrollment utterances 144 based on phrases that that were not specifically provided for the user 10. In some examples, the user 10 may speak multiple enrollment utterances 144 where each enrollment utterance is the same phrase or a different phrase. The enrollment utterances 144 could include the user 10 speaking a pre-defined hotword configured to trigger the device 110 to wake-up from a sleep state for processing spoken audio received after the predefined hotword. While the example shows the users 10 providing the spoken enrollment utterance(s) 144 to the device 110, other examples may include one or more of the users 10 accessing the speech identification system 140 from another device (e.g., a smart phone) to provide the enrollment utterance(s) 144. Upon receiving the enrollment utterances 144, the speaker identification system 140 processes the enrollment utterances 144 to generate a speaker representation for each enrollment utterance 144. The speaker identification system 140 may generate a speaker signature 146 for the user 10 from all, some, or one of the speaker representations for the enrollment utterances 144. In some examples, the speaker signature 146 is an average of the respective speaker representations for the multiple enrollment utterances 144. In other examples, the speaker signature 146 corresponds to a particular speaker representation from a particular enrollment utterance 144 that is selected based on one or more criteria (e.g., based on an audio or voice quality of the audio for the selected enrollment utterance 144). Once a speaker signature 146 is generated for a speaker 10, the speaker signature 146 may be stored locally on the device 110 or stored in the remote system 130 (e.g., in the remote memory hardware 136).

After enrollment, when the device 110 detects a query utterance 148 by a user 10 within the speech environment 100, the speaker identification system 140 is configured to identify whether or not the speaker 10 of the query utterance 12 is an enrolled user 10E of the device 110 based on the query utterance 148. A query utterance 148 may refer to a special type of utterance or spoken phrase, such as a text-dependent verification phrase, or more generally refer text-independent phrases that may include any utterance 12 spoken by a user 10 subsequent to the completion of the enrollment process for one or more user 10. Here, a verification process performed by the verifier 200 identifies whether the speaker 10 of the detected query utterance 148 is an enrolled user 10E and generates the response 142 to indicate whether or not the speaker 10 is an enrolled user 10E. In some examples, the verifier 200 has access to speaker signatures 146 that have been generated for enrolled users 10E and compares the detected query utterance 148 by the speaker 10 to the speaker signatures 146 to determine whether the query utterance 148 corresponds to a particular speaker signature 146. In these examples, when the query utterance 148 corresponds to a particular speaker signature 146, the verifier 200 determines that the query utterance 148 was spoken by an enrolled user 10E and generates a response 142 that indicates that the speaker 10 of the query utterance 148 is an enrolled user 10E.

In some implementations, when the speaker identification system 140 generates a response 142 that the speaker 10 is not an enrolled user 10E, the speaker identification system 140 prompts the speaker 10 to determine if the user 10 wants to become an enrolled user 10E on the device 110. In some configurations, prior to prompting the unenrolled user 10 to become an enrolled user 10E, the device 110 is configured with criteria, such as security criteria, to ensure that an owner of the device 110 has given the unenrolled user 10 or guest user permission to become an enrolled user 10E of the device 110. This may prevent anyone from simply enrolling and gaining unwanted control of the device 110.

FIG. 1A illustrates three users 10a-c that first enrolled with the device 110 by performing the enrollment process. In other words, FIG. 1A depicts at least one enrollment utterance 144, 144a-c being sent to the device 110 by each user 10 to enroll with the device 110. Following the enrollment process, the third user 10c speaks a query utterance 148 to the device 110. When the device 110 receives the query utterance 148, the device 110 communicates the query utterance 148 along with any speaker signatures 146 to the speaker identification system 140 to enable the verifier 200 to verify that the third speaker 10c is an enrolled user 10E. Here, when the verifier 200 verifies that the third speaker 10c is indeed an enrolled user 10E, the speaker identification system 140 communicates the response 142 to the device 110 to indicate that the third speaker 10c is an enrolled user 10E with the device 110. Once verified, the third speaker 10c may use the device 110 or access some aspect of computing functionality offered by the device 110 that an enrolled user 10E has permission to access or, more particularly, designated to the third user 10c. In some examples, the query utterance 148 includes a hotword followed by a query. In these examples, the verifier 200 may verify the third speaker 10c based on only a portion of the audio corresponding to the hotword, only a portion of the audio corresponding to the query, or the entire audio including both the hotword and the query. In additional examples, the query utterance 148 may be a particular verification phrase that an enrolled user 10E provides to the verifier 200 to verify the identity of the enrolled user 10E.

Figure 1B:
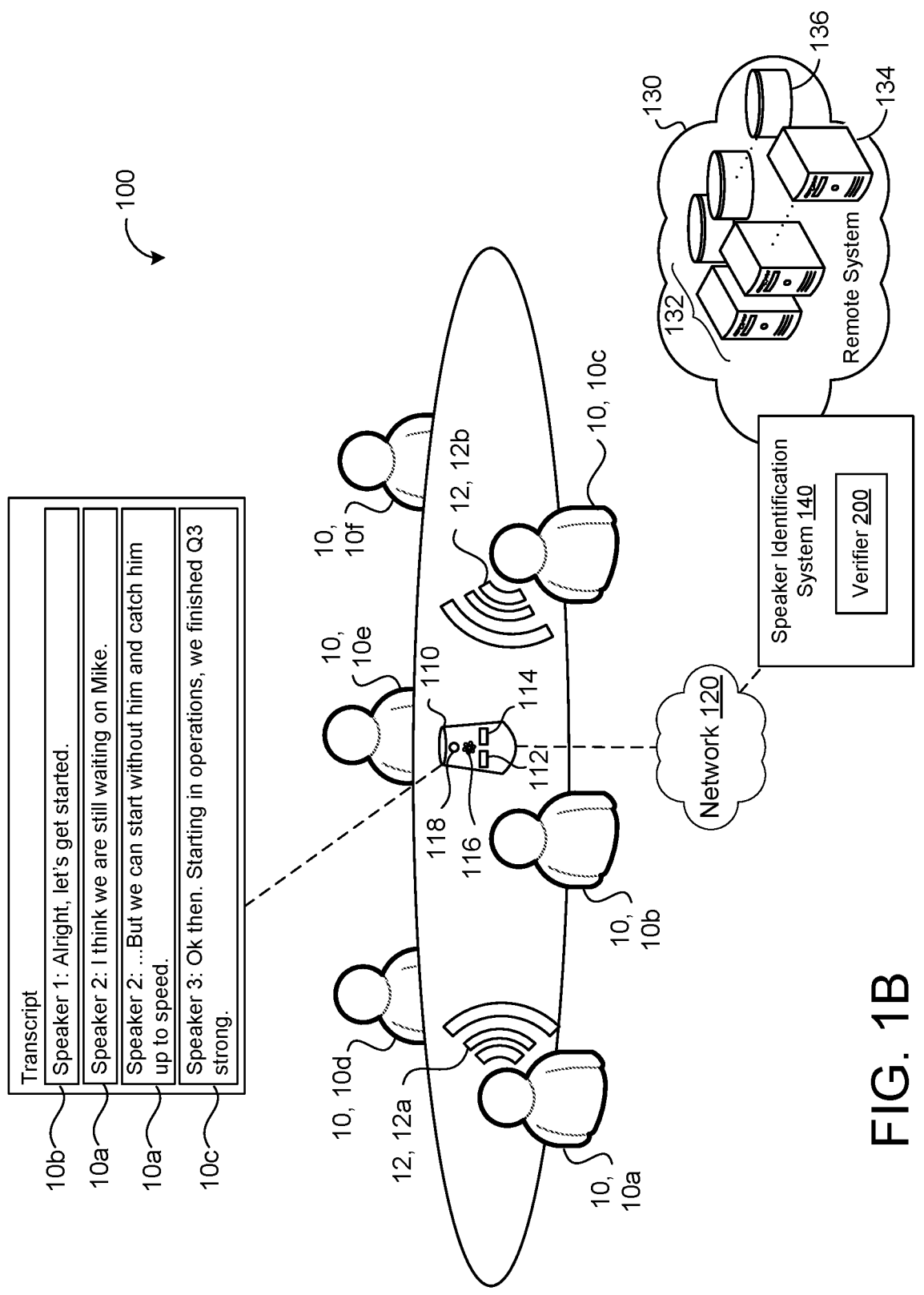

FIG. 1B is an example speech environment 100 that uses the speaker identification system 140 to identify speakers 10 or changes between speakers 10 for a diarization system associated with the device 110. Here, the device 110 detects a first utterance 12a and then detects a subsequent second utterance 12b and determines whether the first utterance 12a and the second utterance 12b correspond to the same speaker 10 or different speakers 10. By differentiating whether an utterance 12 is from the same speaker 10 or not, the speaker identification system 140 is able to assist, for example, a diarization system in identifying a speaker 10 during an audio stream received by the device 110. In other words, when the verifier 200 verifies that the speaker 10 of the second utterance 12b is a different speaker 10 than the speaker 10 of the first utterance 12b, the verifier 200 may generate a response 142 to inform the diarization system of this difference. In the example shown, speech systems associated with the device 110 may use the response 142 from the verifier 200 to generate speaker labels when a speech processing system associated with the device 110 is generating a transcript for the audio stream. For example, FIG. 1B illustrates a meeting with six users 10a-f of the device 110. During the meeting, the device 110 is being used to generate a transcript for the meeting. As part of the transcript, the transcript includes speaker labels that identify who is speaking what information. By using the speaker identification system 140 during the meeting, the device 110 is able to use the verifier 200 to verify that a label for a given speaker in the transcript should change or should remain the same based on the verifier 200 determining whether two subsequent utterances 12 are spoken by the same speaker 10 or different speakers 10. For instance, FIG. 1B depicts that a first utterance 12a by the speaker 10a labeled "speaker 2" is followed by a second utterance 12b by the speaker 10c labeled "speaker 3." Since, the verifier 200 confirms that these two utterances 12a-b are from different speakers 10 in its response 142, the device 110 uses the response 142 to indicate that a new speaker label needs to occur in the transcript for the second utterance 12b. In some examples, besides verifying whether the speakers are the same or different, the speaker identification system 140 is configured to generate a response 142 that includes the identity of the speaker 10. For instance, referring back to FIG. 1A, if the speaker identification system 140 includes speaker signatures 146 that are labeled as to the identity of the speaker 10, when an utterance 12 corresponds (e.g., matches or closely resembles) to a particular labeled signature 146, the speaker identification system 140 may include the labeled identity for that particular signature in its response 142.

To more broadly refer to multiple potential applications of the speaker identification system 140, all types of utterances (e.g., enrollment utterances 144, query utterance 148, or just general speaking utterances 12) and speaker signatures 146 may be more generally referred to as audio samples 202 (FIGS. 2A-2D). An audio sample refers to any length of audio data provided to the device 110 (e.g., by a user 10) or to the speaker identification system 140. For example, an enrollment utterance 12 is an audio sample 202 spoken by a particular user 10 that includes some length of audio data to perform the enrollment process. In some examples, an audio sample 202 may correspond to an entire utterance 12 spoken by a user 10 or some portion of the utterance 12 spoken by the user 10. Therefore, the device 110 receives the audio sample 202 from a user 10 of the device 110 (e.g., at the audio capturing device 116) and communicates the audio sample 202 or some derivative of the audio sample 202 to the speaker identification system 140.

Figure 2A:
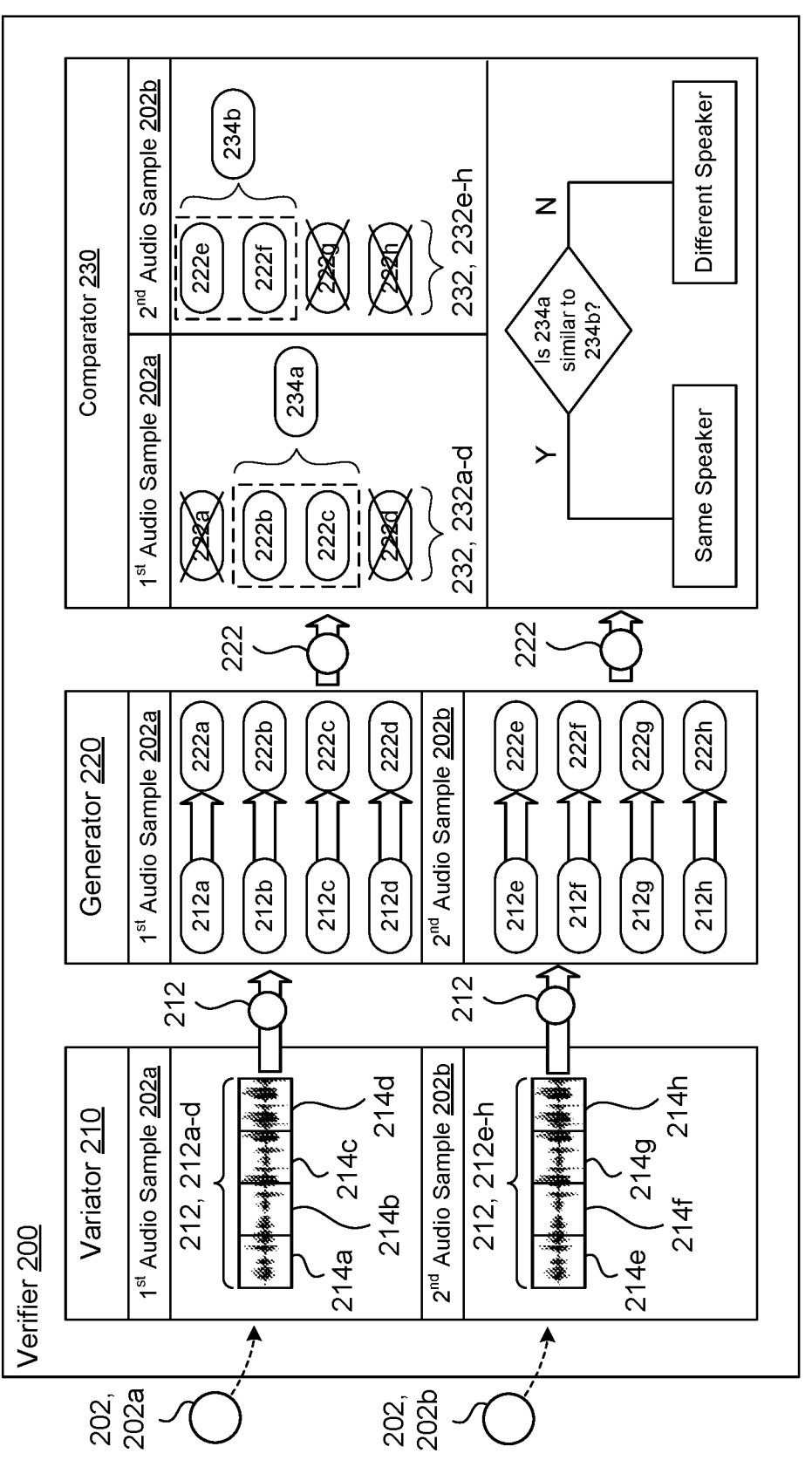
FIGS. 2A-2D are schematic views of example verifiers of the speaker identification system of FIGS. 1A and 1B.
Figure 2B:
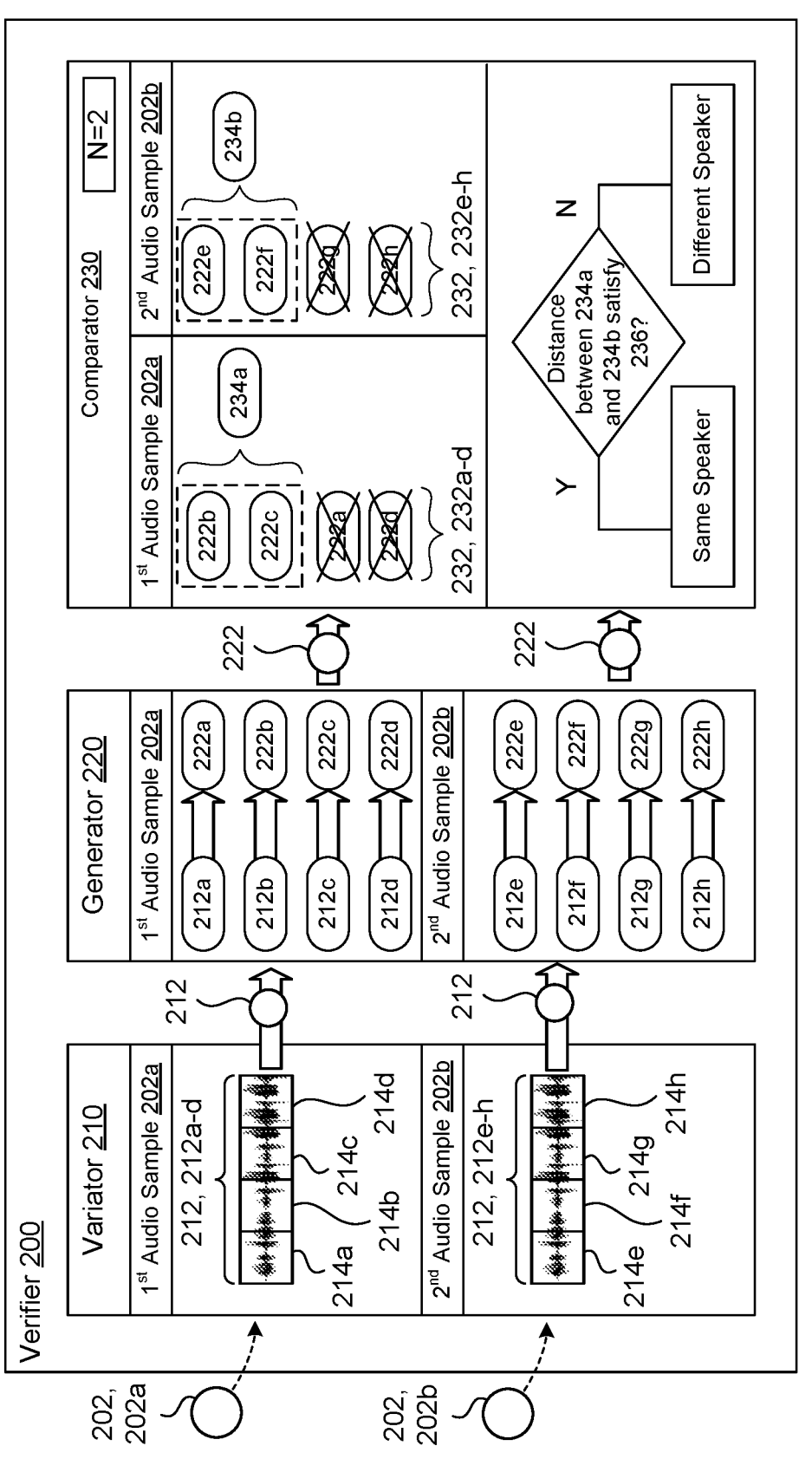
Figure 2C:
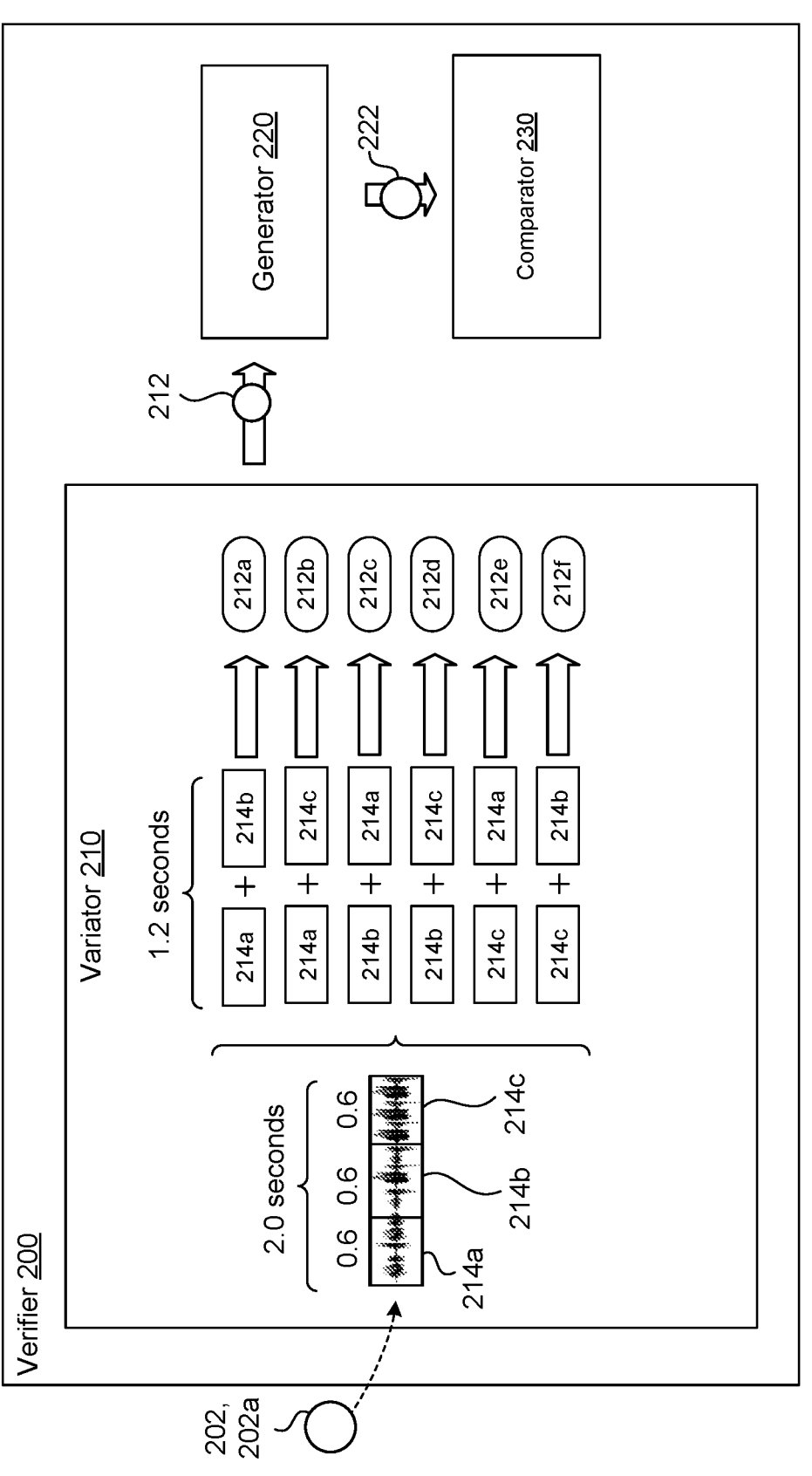

Referring to FIGS. 2A-2C, the verifier 200 is configured to perform a vector-based approach to speaker verification. In the vector-based approach, the verifier 200 includes a variator 210, a generator 220, and a comparator 230. The variator 210 is configured to receive an audio sample 202 and to generate multiple sample variations 212, 212a-n of the audio sample 202. Each sample variation 212 corresponds to a version of the audio sample 202 that has undergone some augmentation technique. In some examples, the variator 210 uses an augmentation technique that divides the audio sample 202 into slices 214 such that each slice 214 corresponds to a sample variation 212. For example, FIG. 2A depicts the audio sample 202 being divided into four audio slices 214a-d to form four audio sample variations 212a-d.

The generator 220 is configured to receive each sample variation 212 of the audio sample 202 and to generate a speaker representation 222 for each sample variation 212. In other words, although the audio sample 202 from the speaker 10 has undergone some type of augmentation technique at the variator 210, each sample variation 212 will still include speech characteristics derived from the audio sample 202. For instance, when the variator 210 forms the sample variation 212 by dividing the audio sample 202 into slices 214, each slice 214, as a subset of the audio sample 202, will include a subset of speech characteristics corresponding to that particular slice 214. In some implementations, such as the vector-based approach, the speaker representation 222 generated by the generator 220 is an acoustic embedding 222 of the sample variation 212. An acoustic embedding 222 is a type of speaker representation 222 that refers to an n-dimensional vector where each dimension of the vector represents some form of a speech characteristic according to its acoustic features. In other words, the acoustic embedding 222 corresponds to a vector representation of speech characteristics for the sample variation 212 since the sample variation 212 is a derivative of an audio sample 202 spoken by a speaker 10. The acoustic embedding 222 may include a d-vector. In some configurations, the generator 220 generates the acoustic embedding 222 by leveraging an acoustic model (AM) of a speech recognition system in communication with the speaker identification system 140. Here, the generator 220 may include a version of the AM or communicate sample variations 212 to the AM of a speech recognition system in order for the AM to use its model that maps segments of audio (i.e., frames of audio) to phonemes to generate the acoustic embeddings 222 for the generator 220.

In some implementations, since the verifier 200 performs the verification process on two audio samples 202a-b, the generator 220 generates a first set of acoustic embeddings 222 for the first audio sample 202a and a second set of acoustic embeddings 222 for the second audio sample 202b. In other words, the generator 220 generates an acoustic embedding 222 for each sample variation 212 of the audio sample 202 to form a set of acoustic embeddings 222 for that particular audio sample 202. With multiple acoustic embeddings 222 for each audio sample 202, the comparator 230 functions to determine which acoustic embedding 222 or subset of acoustic embeddings 222 are likely the best acoustic embeddings 222 to represent the speaker 10 of the audio sample 202. As previously stated, instead of relying on, for example, a single acoustic embedding 222 for the audio sample 202 to represent the speaker 10 accurately, the verifier 200 produces multiple variations 212 of the audio sample 202 such that there is likely a greater probability that at least one of the many variations 212 of the audio sample 202, or some combination of the variations 212, accurately represent the speaker 10. This means that the multiple sample variations 212 represented by multiple acoustic embeddings 222 should be evaluated to determine one or more acoustic embeddings 222 that appear to best represent the speech characteristics of the speaker 10 of the audio sample 202.

To perform this role, the comparator 230 is configured to evaluate each acoustic embedding 222 from the generator 220 as a candidate acoustic embedding 232 and to determine which single candidate 232 or set of candidates 232a-n would best represent the speech characteristics of the speaker 10 of the audio sample 202. In some examples, the comparator 230 functions by removing a subset of candidate acoustic embeddings 232 from the set of candidate acoustic embeddings 232 and generating an aggregate acoustic embedding from the remaining candidate acoustic embeddings 232. For instance, FIG. 2A depicts four candidate acoustic embeddings 232a-d for the first audio sample 202 that correspond to the acoustic embeddings 222a-d from the generator 220 and four acoustic embeddings 232e-h for the second audio sample 202 that corresponding to the acoustic embeddings 222e-h from the generator 220. Here, the comparator 230 reviews each candidate acoustic embedding 232 with respect to the other candidate acoustic embedding 232 in the set and makes the determination of which candidate acoustic embedding(s) 232 to remove. For instance, FIG. 2A illustrates the comparator 230 removing two candidate acoustic embeddings 222*a,d* in the first set for the first audio sample 202*a* and two candidate acoustic embeddings 222*e,f* in the second set for the second audio sample 202*b*. From the remaining candidate acoustic embeddings 232*b,c* in the first set and the remaining candidate acoustic embeddings 232*e,f* in the second set, the comparator 230 generates a first aggregate acoustic embedding 234*a* for the first audio sample 202*a* and a second aggregate acoustic embedding 234*b* for the second audio sample 202*b*. In some examples, the comparator 230 generates the aggregate acoustic embedding 234 by determining an average vector for the remaining candidate acoustic embeddings 232.

In some examples, the comparator 230 evaluates the set of candidate acoustic embeddings 232 by determining a score for each candidate acoustic embedding 232 in the set. In some configurations, the score corresponds to a function of the average cosine similarity between a given candidate acoustic embedding 232 and the other candidate acoustic embeddings 232 in a set for a particular audio sample 202. The cosine similarity refers to a metric that measures the cosine of the angle between two vectors in dimensional space. By generating a cosine similarity between a given candidate acoustic embedding 232 and each other candidate acoustic embedding 232 in a set of candidate acoustic embeddings 232, all of the cosine similarities for the given candidate may be averaged together to generate the average cosine similarity score. In some implementations, the score corresponds to a function of the Euclidean distance between a given candidate acoustic embedding 232 and the other candidate acoustic embeddings 232 in a set for a particular audio sample 202. For instance, like the cosine similarity, the comparator 230 determines the Euclidean distance between a given candidate 232 and each other candidate 232. From these multiple Euclidean distances for the given candidate 232, the score is set equal to the average of all of the multiple Euclidean distances to represent an overall Euclidean distance score for the candidate 232. After generating a score by any method, the comparator 230 may rank or order the set of candidates 232 based on the score. For example, the scores are ordered in descending order from the greatest score to the least score where the greatest score represents that the candidate acoustic embedding 232 with the greatest score is the closest on average to every other candidate acoustic embedding 232 in the set in the dimensional vector space. After ordering the set of candidate acoustic embeddings 232 for a given audio sample 202, the comparator 230 may be configured to select N number of candidates 232 from the ordered list and to remove the candidates 232 not selected. For instance, FIG. 2B shows the comparator 230 having ordered the set of candidate acoustic embeddings 232 for the first audio sample 202*a* and the set of candidate acoustic embeddings 232 for the second audio sample 202*b*. Here, N=2 and the comparator 230 selects two of the candidate acoustic embeddings 232 in the ordered list with the greatest score while removing the rest of the candidate acoustic embeddings 232. The comparator 230 then uses the selected N acoustic embeddings 232 to generate the aggregate acoustic embedding 234 for the audio sample 202. Other selection criteria are also possible. For instance, instead of selecting N candidate acoustic embeddings 232 to for the aggregate acoustic embedding 234, the comparator may remove N candidate acoustic embeddings 232 from the set. As another example, the comparator may remove T-N candidate acoustic embeddings 232 from the set where T is the total number of candidate acoustic embeddings 232 in the set.

Alternatively, instead of selecting N candidate acoustic embeddings 232 with the greatest score, the comparator 230 is configured with a threshold score value such that the comparator 230 generates the aggregate acoustic embedding 234 using all candidate acoustic embeddings 232 that satisfy the threshold score value (e.g., equal or exceed the set threshold score value). By using a scoring process, the comparator 230 may ensure that outlier acoustic embeddings 222 of the sample variations 212 for the audio sample 202 that are likely inaccurate representations of speech characteristics for the speaker 10 of the audio sample 202 have minimal impact on the verifier 200. In some configurations, the comparator 230 performs some combination of the N selection and the threshold score value. For example, in knowing that N number of candidate acoustic embeddings 232 will form the aggregate acoustic embedding 234, the comparator 230 determines a score that corresponds to the Nth candidate acoustic embedding 232 in the ordered list of candidate acoustic embeddings 232 and sets the threshold score to this value. In this approach, the comparator 230 may also review the threshold score that corresponds to the Nth candidate 232 to determine if the number N should be updated (e.g., increased or decreased based on the threshold score).

With the aggregate acoustic embedding 234 for each audio sample 202*a-b*, the comparator 230 may then compare each aggregate acoustic embedding 234 to determine whether the first audio sample 202*a* and the second audio sample 202*b* are from the same speaker 10 or not. In some examples, the comparator 230 determines that the first audio sample 202*a* and the second audio sample 202*b* are from the same speaker 10 when the first aggregate acoustic embedding 234*a* for the first audio sample 202*a* matches or closely resembles the second aggregate acoustic embedding 234*b* of the second audio sample 202*b*.

In some implementations, such as FIG. 2B, in order to determine whether the first aggregate acoustic embedding 234*a* for the first audio sample 202*a* matches or closely resembles the second aggregate acoustic embedding 234*b* of the second audio sample 202*b*, the comparator 230 determines the distance (e.g., the cosine distance) between the first aggregate acoustic embedding 234*a* and the second aggregate acoustic embedding 234*b*. Here, the comparator 230 may be configured such that when the distance between the first aggregate acoustic embedding 234*a* and the second aggregate acoustic embedding 234*b* satisfies a distance threshold 236, the comparator 230 determines that the first audio sample 202*a* and the second audio sample 202*b* are from the same speaker 10. Otherwise, when the distance between the first aggregate acoustic embedding 234*a* and the second aggregate acoustic embedding 234*b* fails to satisfy the distance threshold 236, the comparator 230 determines that the first audio sample 202*a* and the second audio sample 202*b* are not from the same speaker 10. The distance threshold 236 refers to a value that is set to indicate a confidence level that the speaker 10 of the first audio sample 202*a* is likely the same speaker 10 as the second audio sample 202*b*.

In some implementations, the augmentation technique of the variator 210 has some limitations. For instance, when the variator 210 generates the sample variations 212 using the augmentation technique that divides the audio sample 202 into slices 214, the size of the slices 214 cannot be so small that an individual slice 214 includes very little speech characteristic data to form a meaningful speaker representation 222. If the slice 214 is too small, the speech characteristics corresponding to the slice 214 may become attenuated in their representation of the speaker 10. Due to this limitations, a sample variation 212 that has a length of less than some time threshold (e.g., one second) may not form a meaningful speaker representation 222. Therefore, the slicing augmentation technique may be constrained to prevent the size of a given slice 214 from being less than the time threshold. Unfortunately, an audio sample 202 that corresponds to enrollment utterances 144 or query utterances 148 is often only a few seconds long. This would mean that the technique of slicing would only generate a few speaker representations 222 instead of a larger number that would likely increase the accuracy of the verifier 200.

To overcome this issue, the variator 210 may combine the slicing technique with other augmentation techniques (e.g., a shuffle technique and/or a concatenation technique). For example, as shown in FIG. 2C, the variator 210 may divide an audio sample 202 that is two seconds long into three slices 214*a-c* (such that each slice 214 is about 0.66 seconds). Here, if the time threshold was equal to one second, the generator 220 would generate a speaker representation 222 for each slice 214 that is unlikely to improve the accuracy of the verifier 200. Instead, after slicing the audio sample 202, the variator 210 may reconstruct a number of slices 214 together (i.e., concatenate some number of slices 214 together) such that the total length of the concatenated slices 214 is greater than the time threshold (e.g., one second). This way, the reconstructed sample variation 212 can have enough slices 214 combined together to avoid suffering from poor speaker characteristics. Furthermore, this approach capitalizes on the fact that the generator 220 may generate a speaker representation 222 for any length of audio. Therefore, the variator 210 does not need to reconstruct slices 214 to have a length equal to that of the original audio sample 202, but instead the reconstructed slices may have a different length of time when compared to the original audio sample 202. For example, FIG. 2C depicts each sample variation 212*a-f* constructed from two slices 214 to have a total length of 1.2 seconds, which is less than the original length of the audio sample 202, two seconds.

Moreover, FIG. 2C illustrates that, when reconstructing more than one slice 214 together to form the sample variation 212, the slices 214 may be shuffled in an order that is different from the order that the slices 214 appeared in the audio sample 202. For instance, the variator 210 forms the third sample variation 212*c* from an ordered combination of the second slice 214*b* and the first slice 214*a* which is the reverse of the original order for the audio sample 202 that is represented by the first sample variation 212*a*. In FIG. 2C, the variator 210 is able to utilize the reshuffling or mixing of slices 214 and the concatenation of slices 214 together to form six sample variations 212*a-f*. The variator 210 is able to shuffle and reconstruct the slices 214 in any and all permutations as long as the variator 210 avoids forming a sample variation 212 with a length of time less than the time threshold. For example, if the sample audio 202 were sliced into five slices 214, the variator 210 would be able to form one-hundred and twenty sample variations 212 because the number of permutations may be represented as P(n, r) where n is the number of slices 214 and r is equal to the number of slices 214 being concatenated together to form the sample variation 212. Stated differently, the variator 210 would be able to form one-hundred and twenty sample variations 212 because n=5 and r=5 (i.e. P(5,5)).

Figure 2D:
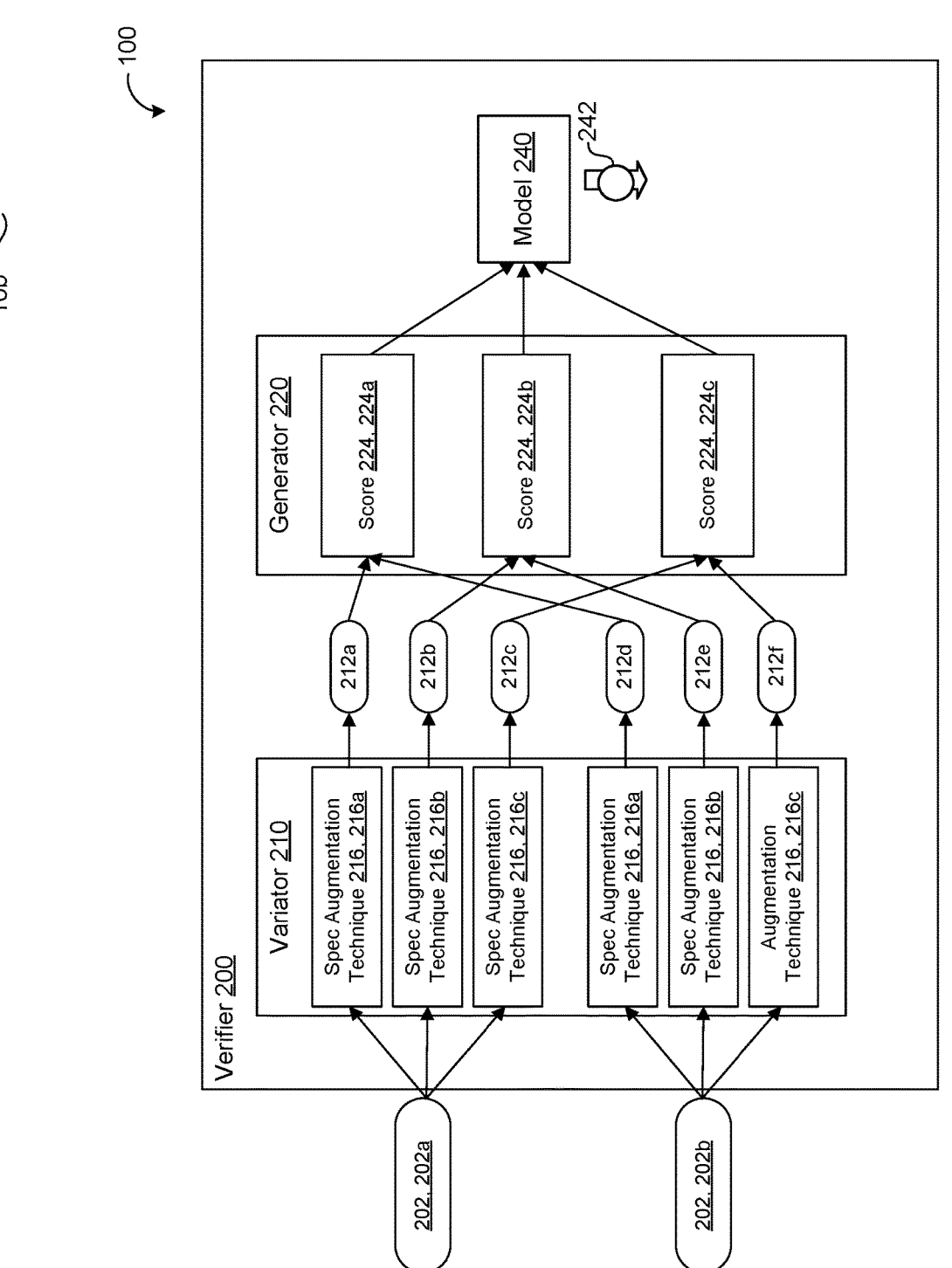

FIG. 2D is an example of the model-approach for the speaker verification process. Here, the verifier 200 does not include a comparator 230, but instead includes a model 240 that is configured to generate a prediction 242 of whether the speaker 10 of the first audio sample 202*a* is the same speaker 10 as the second audio sample 202*b*. In the model approach, the variator 210 is configured to generate sample variations 212 by performing several augmentation techniques on a frequency representation of the audio sample 202. For instance, the variator 210 performs multiple spectrogram augmentation techniques 216, 216*a-n* on a spectrogram of the audio sample 202. A spectrogram generally refers to a visual representation of a spectrum of frequencies for an audio signal corresponding to the audio sample 202. A spectrogram may also sometimes be referred to as a sonograph, voiceprint, or voicegram. As a visual representation, the variator 210 is configured to augment the visual time sequence of a spectrogram for the audio sample 202. Some examples of spectrogram augmentation techniques 216 include time masking or adding 216, 216*a*, frequency masking 216, 216*b*, and time warping 216, 216*c* (i.e., spectrogram stretching). When performing time masking 216*a*, the variator 210 may set particular parameters such as an initial offset, a removal width corresponding to the amount of data (e.g., frames) that will be removed from the spectrogram, and a width to keep that specifies one or more frames of the spectrogram to keep undisrupted. In contrast, time masking includes parameters that specify frames to duplicate or to add to the spectrogram.

As shown in FIG. 2D, when the variator 210 receives the first audio sample 202*a* and the second audio sample 202*b*, the variator 210 performs the same spectrogram augmentation techniques on each audio sample 202. For instance, when the variator 210 performs time masking 216*a*, frequency masking 216, and time warping 216*c* on a spectrogram corresponding to the first audio sample 202*a*, the variator 210 performs the same augmentation techniques 216 of time masking 216*a*, frequency masking 216, and time warping 216*c* on a spectrogram corresponding to the second audio sample 202*b*. By performing the same spectrogram augmentation techniques 216 on each audio sample 202, the verifier 200 ensures that the audio samples 202*a-b* are comparable by the generator 220 and/or model 240. As a result from each spectrogram augmentation technique 216, the variator 210 generates a corresponding sample variation 212.

The generator 220 is configured to receive all of the sample variations 212 from the variator 210 and to generate a score 224 for each spectrogram augmentation technique 216. For instance, the generator 220 compares a first sample variation 212*a* generated by a first spectrogram augmentation technique 216*a* on the first audio sample 202*a* to a second sample variation 212*d* generated by the first spectrogram augmentation technique 216*a* on the second audio sample 202*b*. For the second spectrogram augmentation technique 216*b*, the generator 220 compares a third sample variation 212*b* generated by the second spectrogram augmentation technique 216*b* on the first audio sample 202*a* to a fourth sample variation 212*e* generated by the second spectrogram augmentation technique 216*b* on the second audio sample 202*b*. For the third spectrogram augmentation technique 216*c*, the generator 220 compares a fifth sample variation 212*c* generated by the third spectrogram augmentation technique 216*c* on the first audio sample 202*a* to a sixth sample variation 212*f* generated by the third spectrogram augmentation technique 216*c* on the second audio sample 202*b*. As shown in FIG. 2D, the generator's comparison of the first spectrogram augmentation technique 216*a* results in a first score 224*a*. The generator's comparison of the second spectrogram augmentation technique 216*b* results in a second score 224*b*. The generator's comparison of the third spectrogram augmentation technique 216*c* results in a third score 224*c*. This process may repeat depending on the number of spectrogram augmentation techniques being used. For example, although the variator 210 is performing three techniques 216, the variator 210 may perform four or even five techniques in a scalable manner. In some examples, the score 224 determined by the generator 220 is a cosine similarity score 224.

The model 240 is configured to receive the scores 224 as input and to generate a prediction 242 of whether the speaker 10 of the first audio sample 202*a* is the same speaker 10 as the second audio sample 202*b* as output. In some implementations, the prediction 242 corresponds to a probability that the first audio sample 202*a* and the second audio sample 202*b* belong to the same speaker 10. In some configurations, the model 240 is a machine learning model or neural network that is configured to process data characterizing an audio sample 202 (e.g., a score 224 from the generator 220). The model 240 may include one or more layers of nonlinear units to generate the prediction 242 based on the received input. In some implementations, the model 240 lacks a softmax or other classification layer. In some examples, the model 240 is a Long Short-Term Memory (LSTM) neural network that includes one or more LSTM memory blocks. Each LSTM memory block can include one or more memory cells, and each memory cell can include an input gate, a forget gate, and an output gate that allow the cell to store previous states for the cell, e.g., for use in generating a current activation or to provide to other components of the model 240. The model 240 may be a feedforward neural network, a convolutional neural network, a recurrent neural network, or may be a deep neural network having several portions of different types.

Before the model 240 is deployed for real-time or inference prediction, the model 240 undergoes a training process to teach the model 240 how to generate an accurate prediction 242. The model 240 may learn how to generate predictions 242 by iteratively updating current values of internal parameters (e.g., of its neural network) over a series of training cycles. In each training cycle, the model 240 processes a batch of training examples. The output of the model 240 in each cycle is a set of predictions 242 that has been generated for each training example in the batch. During training, the model 240 may be trained to optimize a loss function or other objective function. The loss function is generally formulated to minimize variation among the outputs or predictions 242 for training examples of the same speaker, while maximizing differences among predictions 242 for training examples of different speakers.

FIG. 3 is a flowchart of an example arrangement of operations for a method 300 of generating a speaker representation 222 for an audio sample 202. At operation 302, the method 300 receives a first audio sample 202, 202*a* from a first speaker 10, 10*a* and a second audio sample 202, 202*b* from a second speaker 10, 10*b*. At operation 304, the method 300 includes sub-operations 304*a-d* for each audio sample 202 of the first audio sample 202*a* and the second audio sample 202*b*. At operation 304*a*, the method 300 divides the respective audio sample 202 into a plurality of slices 214. At operation 304*b*, based on the plurality of slices 214, the method 300 generates a set of candidate acoustic embeddings 232 where each candidate acoustic embedding 232 includes a vector representation 222 of acoustic features. At operation 304*c*, the method 300 removes a subset of the candidate acoustic embeddings 232 from the set of candidate acoustic embeddings 232. At operation 304*d*, the method 300 generates an aggregate acoustic embedding 234 from the remaining candidate acoustic embeddings 232 in the set of candidate acoustic embeddings 232 after removing the subset of the candidate acoustic embeddings 232.

Figure 4:
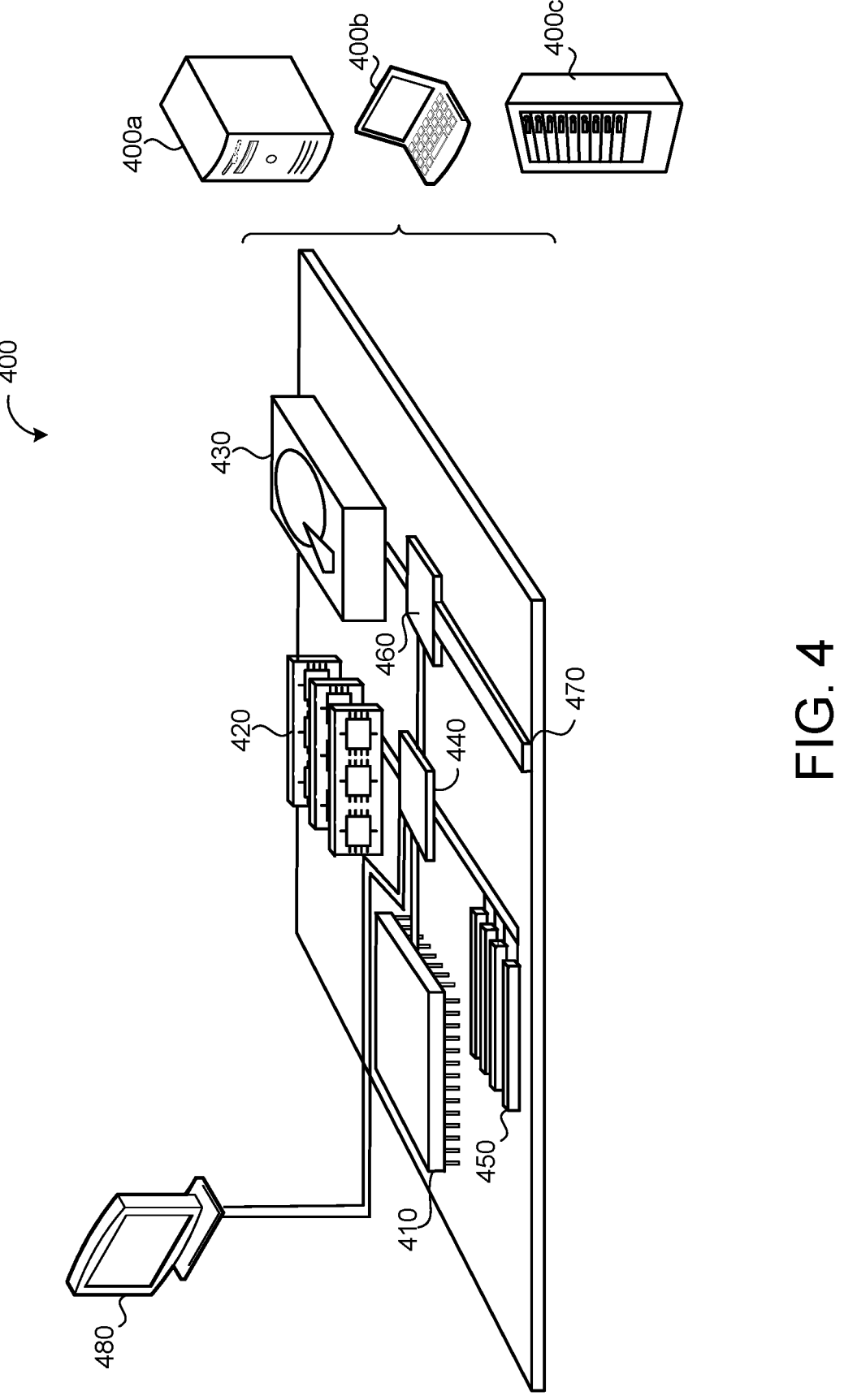
FIG. 4 is a schematic view of an example computing device that may be used to implement the systems and methods described herein.

FIG. 4 is schematic view of an example computing device 400 that may be used to implement the systems (e.g., the speaker identification system 140 and/or verifier 200) and methods (e.g., method 300) described in this document. The computing device 400 is intended to represent various forms of digital computers, such as laptops, desktops, worksta- tions, personal digital assistants, servers, blade servers, mainframes, and other appropriate computers. The compo- nents shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/ controller 440 connecting to the memory 420 and high- speed expansion ports 450, and a low speed interface/ controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state infor- mation) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implemen- tations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving a first audio sample from a first speaker and a second audio sample from a second speaker;
   for each respective audio sample of the first audio sample and the second audio sample:
      dividing the respective audio sample into a plurality of audio slices;
      reordering the plurality of audio slices divided from the respective audio sample into an order that is different from the respective audio sample;
      concatenating the reordered audio slices; and
      generating a first respective sample variation by performing a first spectrogram augmentation technique on a frequency representation of the respective audio sample, the first spectrogram augmentation technique comprising, for each respective audio sample of the first audio sample and the second audio sample:
         selecting a respective subset of the concatenation of the reordered audio slices of the respective audio sample;
         for each concatenated audio slice of the respective subset of the concatenation of the reordered audio slices, generating a respective acoustic embedding; and generating a respective augmented acoustic embedding by combining the respective acoustic embeddings;

generating a first score based on a comparison of the respective augmented acoustic embeddings; and generating, using a model, a prediction indicating whether the first speaker and the second speaker are the same speaker or different speakers based on the first score.

2. The method of claim 1, wherein the operations further comprise:

for each audio sample of the first audio sample and the second audio sample, generating a second respective sample variation by performing a second spectrogram augmentation technique on the frequency representation of the respective audio sample;

generating a second score based on a comparison of the second respective sample variations; and generating, using the model, a second prediction indicating whether the first speaker and the second speaker are the same speaker or different speakers based on the second score.

3. The method of claim 2, wherein the second prediction is based on the first score and the second score.

4. The method of claim 2, wherein the first spectrogram augmentation technique and the second spectrogram augmentation technique are different.

5. The method of claim 2, wherein the operations further comprise:

for each audio sample of the first audio sample and the second audio sample, generating a third respective sample variation by performing a third spectrogram augmentation technique on the frequency representation of the respective audio sample;

generating a third score based on a comparison of the third respective sample variations; and generating, using the model, a third prediction indicating whether the first speaker and the second speaker are the same speaker or different speakers based on the third score.

6. The method of claim 5, wherein the third prediction is based on the first score, the second score, and the third score.

7. The method of claim 5, wherein the first spectrogram augmentation technique is different than the second spectrogram augmentation technique and the third spectrogram augmentation technique is different than the first spectrogram augmentation technique and the second spectrogram augmentation technique.

8. The method of claim 1, wherein the first spectrogram augmentation technique further comprises one of:

a time masking technique;
a frequency masking technique; or
a time warping technique.

9. The method of claim 1, wherein the model comprises a Long Short-Term Memory (LSTM) neural network.

10. The method of claim 1, wherein the operations further comprise training the model by iteratively updating current values of one or more parameters of the model over a series of training cycles.

11. A system comprising:

data processing hardware; and
memory hardware in communication with the data processing hardware, the memory hardware storing instructions that, when executed on the data processing hardware, cause the data processing hardware to perform operations comprising:

receiving a first audio sample from a first speaker and a second audio sample from a second speaker;

for each respective audio sample of the first audio sample and the second audio sample:

dividing the respective audio sample into a plurality of audio slices;

reordering the plurality of audio slices divided from the respective audio sample into an order that is different from the respective audio sample;

concatenating the reordered audio slices; and generating a first respective sample variation by performing a first spectrogram augmentation technique on a frequency representation of the respective audio sample, the first spectrogram augmentation technique comprising, for each respective audio sample of the first audio sample and the second audio sample:

selecting a respective subset of the concatenation of the reordered audio slices of the respective audio sample;

for each concatenated audio slice of the respective subset of the concatenation of the reordered audio slices, generating a respective acoustic embedding; and generating a respective augmented acoustic embedding by combining the respective acoustic embeddings;

generating a first score based on a comparison of the respective augmented acoustic embeddings; and generating, using a model, a prediction indicating whether the first speaker and the second speaker are the same speaker or different speakers based on the first score.

12. The system of claim 11, wherein the operations further comprise:

for each audio sample of the first audio sample and the second audio sample, generating a second respective sample variation by performing a second spectrogram augmentation technique on the frequency representation of the respective audio sample;

generating a second score based on a comparison of the second respective sample variations; and generating, using the model, a second prediction indicating whether the first speaker and the second speaker are the same speaker or different speakers based on the second score.

13. The system of claim 12, wherein the second prediction is based on the first score and the second score.

14. The system of claim 12, wherein the first spectrogram augmentation technique and the second spectrogram augmentation technique are different.

15. The system of claim 12, wherein the operations further comprise:

for each audio sample of the first audio sample and the second audio sample, generating a third respective sample variation by performing a third spectrogram augmentation technique on the frequency representation of the respective audio sample;

generating a third score based on a comparison of the third respective sample variations; and generating, using the model, a third prediction indicating whether the first speaker and the second speaker are the same speaker or different speakers based on the third score.

16. The system of claim 15, wherein the third prediction is based on the first score, the second score, and the third score.

17. The system of claim 15, wherein the first spectrogram augmentation technique is different than the second spectrogram augmentation technique and the third spectrogram augmentation technique is different than the first spectrogram augmentation technique and the second spectrogram augmentation technique.

18. The system of claim 11, wherein the first spectrogram augmentation technique further comprises one of:

a time masking technique;

a frequency masking technique; or a time warping technique.

19. The system of claim 11, wherein the model comprises a Long Short-Term Memory (LSTM) neural network.

20. The system of claim 11, wherein the operations further comprise training the model by iteratively updating current values of one or more parameters of the model over a series of training cycles.

* * * * *